United States Patent Office

2,884,403
Patented Apr. 28, 1959

2,884,403

PROCESS FOR THE PRODUCTION OF DICYANDI-AMIDE RESINS BY THE MELT PROCESS

Bruno Zorn, Koln-Deutz, and Gustav Mauthe, Opladen, Germany, assignors to Farbenfabriken Bayer Aktiengesellschaft, Leverkusen, Germany, a corporation of Germany No Drawing. Application May 24, 1955
Serial No. 510,861

Claims priority, application Germany May 25, 1954

2 Claims. (Cl. 260—45.2)

The present invention relates to a process for the production of resins from mixed dicyandiamide and urea with paraformaldehyde by condensation in the melt.

It is known that dicyandiamide resins which are suitable for the treatment of leather, can be prepared by the condensation of dicyandiamide with formaldehyde in aqueous solution, possibly in the presence of catalysts, with suitable pH values. The condensation can be carried out in such a way that initially a water-soluble product is formed, a water insoluble stage being reached with continued condensation. By means of the addition of anionic substances of the aryl-sulphonic acid type, or condensation products thereof, more especially naphthalene sulphonic acids condensed with from 0.66 to 1 mole of formaldehyde per mole of the naphthalene sulfonic acid, it is, however, possible for these products to be dissolved in an alkaline or neutral medium. The reaction product of the above "water-insoluble" stage can be precipitated from these solutions again by means of acids or metal salt solutions with a precipitating action, for example aluminium sulphate or sodium sulphate solutions. If the condensation is allowed to proceed still further, the products finally obtained are insoluble in water and also in the above naphthalene sulphonic acid resin solutions.

During the condensation of dicyandiamide with paraformaldehyde by the melt process, condensation products are obtained, the tanning properties of which substantially correspond to those of the condensation products which are obtained in aqueous solution when starting with the same initial materials. The production of these condensation products in aqueous solution is described, for example, in United States Patent No. 2,567,238.

Whereas a minimum amount of 3.6 mols of formaldehyde are necessary for one mol of dicyandiamide when operating in solution, it has surprisingly been found that, when using the process according to the invention, condensation products which belong to the above-described second condensation stage and are soluble in sulpho acid are obtained by using substantially less formaldehyde for condensation purposes, for example only 0.5 mol to 1 mol of dicyandiamide.

When larger amounts of paraformaldehyde are used, the melt becomes more thinly viscous and in addition a longer time is necessary for condensation. It is however, unnecessary to use more than 8 mols of paraformaldehyde to 1 mol of dicyandiamide, since the excess formaldehyde does not react and escapes.

The condensation is preferably carried out at a temperature between the melting point of the mixture, which is in the region of 70° C., and about 200° C. The optimum reaction temperature is between 100 and 130° C. and the condensation reaction is slightly exothermic.

The aforementioned aryl sulphonic acids, preferably the sodium salts of naphthalene sulphonic acids condensed with from 0.66 to 1 mode of formaldehyde per mole of the naphthalene sulfonic acid, which make the condensation products soluble in water in the second stage of the condensation, can, for example be added to the mixture to be reacted by the melt process in accordance with the invention, in pulverous form, or even before melting commences.

Depending on the duration of the condensation, products are obtained which require increasing amounts of naphthalene sulphonic acid-formaldehyde condensation products for solubilization purposes. If the naphthalene sulphonic acid component is added immediately to the reactive mixture, it is possible for the course of the condensation to be satisfactorily controlled by solubility tests. Depending on the degree of condensation, resins can be obtained which are soluble in water only from specific temperature ranges. For example, at room temperature clearly soluble resins precipitated only slowly and incompletely upon addition of acetic acid, but they precipitate immediately with sulphuric acid. On the other hand, resins which are completely soluble in water only at temperatures higher than 40% C., for example, produce an immediate and strong precipitate with only one drop of N acetic acid.

It has further been established that up to about 90% of the dicyandiamide can be replaced by urea. If more than 90% of urea is used in the dicyandiamide-urea mixture, resins are obtained which have the properties of the first stage and which, without appreciably assuming the properties of the second stage, are directly transformed after a time into resins having properties of the last stage.

The advantage resulting from the concurrent use of urea in the dicyandiamide melt is that the melts become more liquid and consequently can be stirred and worked up more easily; an additional advantage is that the condensation velocity can be reduced by the addition of urea and by the lowering of temperature thereby made possible because of the decrease in viscosity of the melts. Consequently, the process can be controlled more easily. Fusing the dicyandiamide-urea-paraformaldehyde sulfonate mixture as described gives a product that, after cooling, is water soluble and remains completely soluble on storage of its aqueous solution.

The upper limit for paraformaldehyde is not fixed, but nevertheless the attainment of the last stages is retarded as the amount of paraformaldehyde increases. These stages are reached with constant evolution of formaldehyde, and consequently there is very little purpose from a technical point of view in using more than 6 to 8 mols of paraformaldehyde per mol of dicyandiamide or of urea, since the excess escapes without being used. The range of proportion of the paraformaldehyde is 0.5–8 mol equivalents (i.e. of formaldehyde) to 1 mol of nitrogen compound in the mixture of dicyandiamide and urea.

It has also been found that condensation products having similar properties or properties which are improved in some respects are obtained if the dicyandiamide is wholly or partly replaced by melamine. It has also been established that valuable condensation products are obtained in accordance with the aforementioned process from dicyandiamide together with melamine and without any urea. It has also been found that the process according to the invention can be effectively carried out if thiourea or substituted ureas or thioureas are used instead of urea. Moreover, in the production of these resins, the agent necessary for producing the solution can be added to the melt or to the mixture of starting substances prior to the melting process.

The products according to the invention can also be used for tanning and retanning skins and leathers.

All the resins described above can be used with outstanding success in this stage of condensation for impregnating and tanning purposes, particularly for retanning chrome-tanned, vegetable-tanned or synthetically or otherwise tanned leathers in a manner similar to the condensation products described in United States Patent No. 2,637,622.

The particular advantage of the process according to the invention consists in that the said process can be carried out continuously in worm presses, tube kilns or similar equipment. In addition, the required resin can be quickly and reliably produced with the desired degree of condensation in one working operation. This obviates the troublesome and costly drying of the reaction materials, which usually results in undesirable after-condensation which is difficult to control.

The invention is further illustrated by the following examples without being restricted thereto.

Example 1

A mixture of dicyandiamide, urea and paraformaldehyde is prepared and 75 g. of neutral dry pulverous naphthalene sulphonic acid-resin (for example prepared by 1 mol of naphthalene sulphonic acid being condensed with 0.66 mol of formaldehyde, the product then being neutralised and dried) is mixed with the said mixture before melting commences. After heating for 20 to 40 minutes to 110–120° C. in a glycerine bath while stirring, the melt which has meanwhile become viscous is completely soluble in hot water and reprecipitates at 25° C. upon cooling a 10% solution. Separation of the resin takes place slowly at 40° C. when N acetic acid is added.

Example 2

84 parts of dicyandiamide, 30 parts of urea, 105 parts of paraformaldehyde and 150 parts of naphthalene sulphonic acid-resin are mixed and caused to condense at 110° C. while stirring until a sample of the melt is completely soluble in hot water and can be precipitated at 80° C. with N acetic acid. The 10% solution should start to re-precipitate the resin in a milky form at 50–52° C.

We claim:

1. A process for the production of tanning agents precipitable by acids which comprises heating and melting, at a temperature between 70° and 200° C., a substantially anhydrous mixture of (1) mixed dicyandiamide and urea, the proportion of the urea being not more than 90% of the weight of the total of dicyandiamide and urea or less than about 1 mol for 1 mol of the dicyandiamide, (2) paraformaldehyde in the proportion of 0.5–8 mols of formaldehyde equivalent for 1 mol total of dicyandiamide and urea, and (3) the sodium salt of the condensation product of about 1 mol of napthalene sulfonic acid with from 0.66 to 1 mol of formaldehyde, the said condensation product being in proportion to cause the product to be precipitable by an acid and, after cooling, to remain completely soluble in water or storage of the aqueous solution.

2. The acid precipitable condensate of (1) a mixture of dicyandiamide and urea, the proportion of the urea being not more than 90% of the weight of the total of dicyandiamide and urea or less than about 1 mol for 1 mol of the dicyandiamide, (2) paraformaldehyde in the proportion of 0.5–8 mols of formaldehyde equivalent for 1 mol total of dicyandiamide and urea, and (3) the sodium salt of the condensation product of about 1 mol of naphthalene sulfonic acid with from 0.66 to 1 mol of formaldehyde, the said condensation product being in proportion to cause the product to be precipitable by an acid, soluble in water, and, after cooling, to remain completely soluble on storage of its aqueous solution and the said condensate being the product of the process of claim 1.

References Cited in the file of this patent

UNITED STATES PATENTS

| | | |
|---|---|---|
| 2,550,639 | Dawson | Apr. 24, 1951 |
| 2,737,504 | Dawson et al. | Mar. 6, 1956 |
| 2,774,749 | Stanley et al. | Dec. 18, 1956 |

FOREIGN PATENTS

| | | |
|---|---|---|
| 561,232 | Great Britain | May 11, 1944 |
| 594,791 | Great Britain | Nov. 19, 1947 |
| 436,448 | Italy | June 10, 1948 |

UNITED STATES PATENT OFFICE

CERTIFICATE OF CORRECTION

Patent No. 2,884,403

April 28, 1959

Bruno Zorn et al.

It is hereby certified that error appears in the printed specification of the above numbered patent requiring correction and that the said Letters Patent should read as corrected below.

Column 1, line 70, for "mode" read -- mole --; column 2, line 19, for "40% C.," read -- 40° C., --; column 4, line 13, claim 1, for "water or storage" read -- water on storage --.

Signed and sealed this 18th day of August 1959.

SEAL)
.ttest:

ARL H. AXLINE ttesting Officer

ROBERT C. WATSON
Commissioner of Patents